United States Patent
Bachmat

(10) Patent No.: US 6,766,416 B2
(45) Date of Patent: *Jul. 20, 2004

(54) PROGRAM AND APPARATUS FOR BALANCING ACTIVITY OF DISK STORAGE DEVICES IN RESPONSE TO STATISTICAL ANALYSES AND PRELIMINARY TESTING

(75) Inventor: Eitan Bachmat, Hopkinton, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/289,085

(22) Filed: Nov. 6, 2002

(65) Prior Publication Data

US 2003/0065883 A1 Apr. 3, 2003

Related U.S. Application Data

(63) Continuation of application No. 09/501,419, filed on Feb. 9, 2002, now Pat. No. 6,487,634, which is a continuation of application No. 08/944,606, filed on Oct. 6, 1997, now Pat. No. 6,061,761.

(51) Int. Cl.[7] ......................... G06F 12/02; G11B 17/22
(52) U.S. Cl. ......................... 711/114; 711/4; 711/170; 714/6; 714/7; 710/18; 709/105
(58) Field of Search ........................... 711/112, 114, 711/4, 167, 170; 714/6, 7; 710/18; 709/105

(56) References Cited

U.S. PATENT DOCUMENTS

| | | | |
|---|---|---|---|
| 5,544,313 A | * | 8/1996 | Shachnai et al. .............. 725/92 |
| 5,544,327 A | * | 8/1996 | Dan et al. .................... 709/234 |
| 5,774,660 A | * | 6/1998 | Brendel et al. ............. 709/201 |
| 5,809,239 A | * | 9/1998 | Dan et al. .................... 709/203 |
| 5,819,310 A | * | 10/1998 | Vishlitzky et al. .......... 711/114 |
| 5,841,997 A | * | 11/1998 | Bleiweiss et al. ........... 710/317 |
| 5,881,311 A | * | 3/1999 | Woods .......................... 710/4 |
| 5,926,649 A | * | 7/1999 | Ma et al. ........................ 710/6 |
| 5,999,930 A | * | 12/1999 | Wolff ............................. 707/8 |
| 6,061,761 A | * | 5/2000 | Bachmat ..................... 711/114 |

* cited by examiner

Primary Examiner—Hong Kim
(74) Attorney, Agent, or Firm—George A. Herbster

(57) ABSTRACT

Load balancing of activities on physical disk storage devices is accomplished by monitoring reading and writing operations to logical volumes on the physical disk storage devices. A list of exchangeable pairs of logical volumes is developed based on size and function. Statistics accumulated over an interval are then used to obtain access activity values for each logical volume and each physical disk drive. A statistical analysis selects one logical volume pair. After testing to determine any adverse effect of making that change, the exchange is made to more evenly distribute the loading on individual physical disk storage devices.

19 Claims, 3 Drawing Sheets

PROGRAM AND APPARATUS FOR BALANCING ACTIVITY OF DISK STORAGE DEVICES IN RESPONSE TO STATISTICAL ANALYSES AND PRELIMINARY TESTING

This application is a continuation of Ser. No. 09/501,419 filed Feb. 9, 2000, now U.S. Pat. No. 6,487,634, that is a continuation of application Ser. No. 08/944,606, filed Oct. 6, 1997, now U.S. Pat. No. 6,061,761 issued May 9, 2000.

BACKGROUND OF THE INVENTION

1. Field of the Invention

This invention generally relates to the management of resources in a data processing system and more particularly to the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or drives with the capability of storing large amounts of data up to one terabyte or more. The management of such resources becomes very important because the ineffective utilization of the capabilities of such an array can affect the overall data processing system performance significantly.

Generally a system administrator will, upon initialization of a direct access storage device, determine certain characteristics of the data sets to be stored. These characteristics include the data set size, and volume names and, in some systems, the correspondence between a logical volume and a particular host processor in a multiple host processor system. The system administrator uses this information to configure the disk array storage device by distributing various data sets across different physical devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem has been to propose an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Pat. No. 5,239,649 to McBride et al. discloses a system for balancing the load on channel paths during long running applications. In accordance with the load balancing scheme, a selection of volumes is first made from those having affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In another approach, U.S. Pat. No. 3,702,006 to Page discloses load balancing in a data processing system capable of multi-tasking. A count is made of the number of times each I/O device is accessed by each task over a time interval between successive allocation routines. During each allocation, an analysis is made using the count and time interval to estimate the utilization of each device due to the current tasks. An estimate is also made with the anticipated utilization due to the task undergoing allocation. The estimated current and anticipated utilization are then considered and used as a basis for attempting to allocate the data sets to the least utilized I/O devices so as to achieve balanced I/O activity.

Each of the foregoing references discloses a system in which load balancing is achieved by selecting a specific location for an individual data set based upon express or inferred knowledge about the data set. An individual data set remains on a given physical disk unless manually reconfigured. None of these systems suggests the implementation of load balancing by the dynamic reallocation or configuration of existing data sets within the disk array storage system.

Another load balancing approach involves a division of reading operations among different physical disk drives that are redundant. Redundancy has become a major factor in the implementation of various storage systems that must also be considered in configuring a storage system. U.S. Pat. No. 5,819,310 issued Oct. 1, 1998 discloses such a redundant storage system with a disclosed disk array storage device that includes two device controllers and related disk drives for storing mirrored data. Each of the disk drives is divided into logical volumes. Each device controller can effect different reading processes and includes a correspondence table that establishes the reading process to be used in retrieving data from the corresponding disk drive. Each disk controller responds to a read command that identifies the logical volume by using the correspondence table to select the appropriate reading process and by transferring data from the appropriate physical storage volume containing the designated logical volume. Consequently, when this mirroring system is implemented, reading operations involving a single logical volume do not necessarily occur from a single physical device. Rather read commands to different portions of a particular logical volume may be directed to any one of the mirrors for reading from preselected tracks in the logical volume. Allowing such operations can provide limited load balancing and can reduce seek times. Other redundancy techniques and striping techniques can tend to spread the load over multiple physical drives. However, if the physical drives have multiple logical volumes or portions thereof, the net effect may not balance the load with respect to the totality of the physical disk drives. Thus, none of the foregoing references discloses or suggests a method for providing a dynamic reallocation of physical address space based upon actual usage.

SUMMARY

Therefore it is an object of this invention to provide a dynamic reallocation of a disk array storage device to balance the load requirements on each physical device with multiple logical volumes in a disk array storage device.

Another object of this invention is to provide load balancing in a disk array storage device in which the physical devices can store logical volumes of different sizes.

In accordance with this invention load balancing will occur at some arbitrary time interval, typically one or more days. To that point in time various reading and writing statistics have been accumulated on a logical volume basis. As part of the process, a list of all pairs of exchangeable logical devices is established. The compiled data is then used to select one such, test the effect of the exchange and exchange the selected logical.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
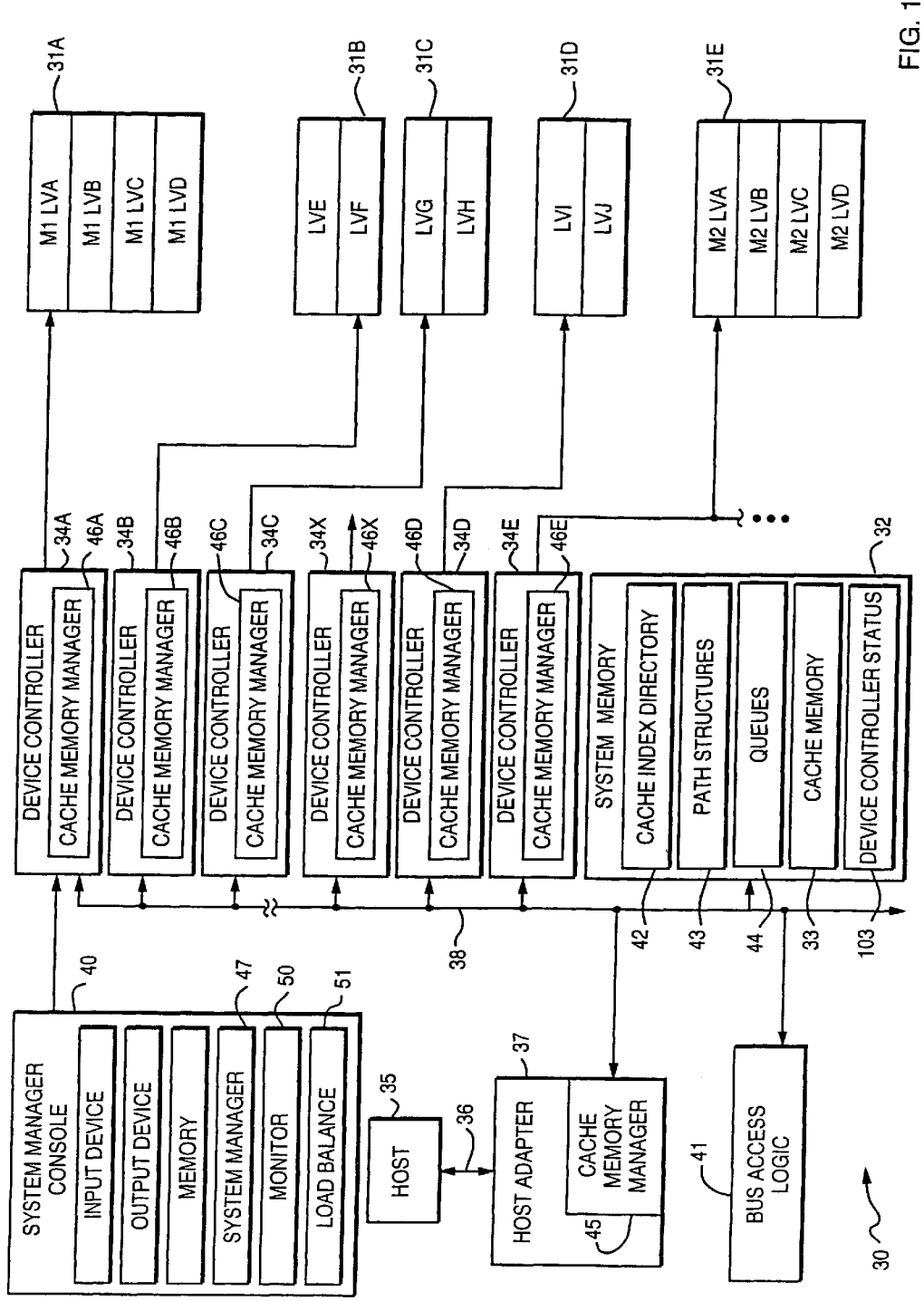
FIG. 1 is a block diagram of a specific data processor that implements this invention.

FIG. 1 depicts, in block form, and as a typical data processing system 30, a Symmetrix 5500 series integrated cached disk array that includes such a data memory system with a number of data storage devices or physical disk storage devices 31A, 31B, 31C, 31D and 31E, by way of example, and a system memory 32 with a cache memory 33. In this particular embodiment the system 30 includes several device controllers 34A, 34B, 34C, 34D and 34E connected to corresponding ones of the physical disk storage devices 31A through 31E plus a device controller 34X representing other controllers and attached physical disk storage devices. Each device controller may have a known basic structure or a more sophisticated structure associated with mirrored operations as described in the above-identified U.S. Pat. No. 5,819,310.

The device controller 34A is shown with an associated physical disk storage device 31A divided into the mirrored logical volumes M1-LVA, M1-LVB, M1-LVC and M1-LVD; the device controller 34E controls the other physical disk storage device 31E that stores the mirrored logical volumes M2-LVA, M2-LVB, M2-LVC and M2-LVD. The logical volumes in physical disk storage devices 31A and 31E are assumed to have the same size for purposes of this explanation. However, mirrored and non-mirrored logical volumes in a physical disk storage device can have different sizes. For example, physical disk storage device 31B is depicted with two logical volumes LVE and LVF. Assume that the LVE logical volume has the same size as the logical volumes in the physical disk 31A and that the logical volume LVF has a size that is three times the size of the logical volume LVE. Physical disk storage device 31C is shown with a logical volume LVG having twice the size of a logical volume LVH which, in turn, would have the same size as the logical volume LVA. Physical disk storage device 31D has a logical volume LVI which is three times the size of the logical volume LVJ which, in turn, has the same size as the logical volume LVA. Moreover, there is no requirement that mirrored logical volumes in one physical disk storage device need to be mirrored on a single mirroring physical disk storage device. For example the locations of the LVJ and M2-LVA logical volumes could be interchanged. As will become apparent, in actual practice the absolute and relative sizes of logical volumes and the positions of the logical volumes will vary.

Still referring to FIG. 1 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

A system manager console 40 includes an additional processor that connects to the system bus 38 typically through one or more of the device controllers, such as device controller 34A by means of a serial or other communications link to the device controller 34A. The system manager console 40 permits a system operator to run set-up and diagnostic programs for configuring, controlling and monitoring the performance of the data processing system 30. Essentially the system manager console 40 enables the operator to establish communications with the host adapter 37, the device controller 34B and the system memory 32.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 2 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Pat. No. 5,206,939 issued Apr. 27, 1993. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such a system, for example, is described in U.S. Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A and 46B in each of the device controllers 34A through 34X. A system manager program 47 performs a similar function for the system manager console 40 and enables the operator to configure the system. Each of the cache manager programs accesses the cache index directory 42 and operates with data structures and queues for storing various commands. More specifically, the cache manager program 45 in the host adapter 37 writes data from the host 35 into the cache memory 32 and updates the cache index directory 42.

In addition each cache memory manager gathers statistics. The cache memory manager 45 will accumulate statistics concerning a number of parameters. For the purpose of this invention, the number of reading and writing operations requested by a host 35 or connected hosts are important. Likewise each of the cache memory managers 46A through 46X in each of the device controllers 34A through 34X gathers statistics for the logical volumes on each connected physical disk storage device. A monitor 50 in the system manager console 40 integrates these cache memory managers to obtain appropriate statistics at given intervals.

From the foregoing, disk operations included in any measure of the loading of a logical volume will include reading operations and writing operations. Reading operations can be further classified as read-hit, read-miss and sequential read operations. A read-hit operation occurs when the data to be read resides in the cache memory 33. A read-miss occurs when the data to be read is not available in the cache memory 33 and must be transferred from a physical disk storage device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and be less than the number of writing operations of the first type.

With this background, the program for determining appropriate reallocations of logical volumes on physical disks in accordance with this invention can be described. The program relies upon information supplied from the performance monitor 50. In one embodiment of this invention the monitor 50 retrieves statistics from each cache memory manager on a periodic basis. The periodicity will be selected according to conventional sampling criteria. Typical periods will be from up to 15 to 30 or more minutes. As each set of statistics is time stamped and are accumulated by logical volume the total number of read operations, a read-hit ratio, a sequential-read ratio and the total number of writing operations over a test interval can be obtained. The load balance program 51 shown in FIG. 1 then operates according to FIGS. 2A and 2B to generate, from that collected monitored performance generally represented by step 60 in FIG. 2A, a reallocation or exchange of a pair of logical volumes. Specifically when it is time to perform an analysis, a wait loop represented as a decision step 61 transfers control to retrieve, by means of the monitor system in step 62, all the statistics that are relevant to the test interval.

The load balance program 51 uses step 63 to define a list of pairs of exchangeable logical volumes. There are several criteria that must be evaluated in determining this list. First, exchangeable logical volumes must have the same size. In actual practice most logical volumes will be selected from one of a relatively small number of physical sizes. Second, any interrelationship between the two logical volumes to be exchanged must be examined to determine whether there is any reason to preclude the exchange. For example, swapping logical volumes on the same physical disk storage device generally will have little or no impact. Mirroring, as described in the above-identified U.S. Pat. No. 5,819,310 or other redundancy may further restrict the available exchangeable pairs of logical volumes. For example, mirrored logical volumes normally will be precluded from residing on the same physical disk storage device or even on physical disk storage devices on the same controller or adjacent controllers. For RAID-5 redundancy, exchangeable pairs of logical volumes usually will be limited to those in the same parity group.

In the specific example of FIG. 1, based on size, the logical volumes LVA through LVE, LVH and LVJ are all potential exchange candidates. Likewise the logical volumes LVF and LVI are candidates for exchange. There is no logical volume as a candidate for exchanging with the LVG logical volume in the specific embodiment shown in FIG. 1.

Using the functional criteria, the potential logical volumes that could be swapped with the logical volume M1-LVA in the physical drive 31A include logical volumes LVE, LVH and LVJ, assuming that an exchange with a mirror would have no effect. Moreover swapping the LVA logical volume in physical disk 31A with any of the logical volumes LVB through LVD in physical drive 31E is precluded because both mirrors of the logical volume LVA would be resident on the same physical disk drive. Other potential logical volume pairs include the pairs LVE-LVH, LVH-LVJ and LVE-LVJ. The logical volumes LVF and LVI define one exchangeable pair. Thus in this particular embodiment there are twenty-seven possible exchangeable pairs of logical volumes.

In step 64, the load balance program 51 uses the accumulated statistics and read-hit ratio to produce a read-miss value, a sequential-read value and a write-to-disk value for each logical volume over the prior test intervalto define a list of possible reconfigurations. As previously indicated the read-miss value corresponds to the number of read operations that require access to a physical disk drive for data, a read-hit being a reading operation that finds the requested data in the cache memory 33 of FIG. 1. When step 64 is completed, there exists, for each logical volume, a logical volume access activity value, x, represented by the sum of the read-miss and write-to-disk operations.

The logical volume access activity value can be further refined to reflect the actual load imposed by different operations. For example, each write operation can be considered as imposing half the load of a read-miss operation. If such an assumption is carried forward, the logical volume access activity is equal to the total number of read-miss operations plus half the total number of write operations. If a series of sequential-read operations occur, the number of events in the sequence can be divided by 4 or some other number to compensate for the difference in loading imposed by sequential and random reading operations. In a mirrored configuration, a read-miss results in only one read operation being performed although there is a potential for two, one from each mirror. Consequently, in a mirrored system the number of read misses to a mirrored logical volume will be halved to compensate for mirroring.

In step 65 the load balancing program 51 constructs a table that identifies the total access activity value for each physical storage device by summing, for each physical disk storage device, the access activity values for each logical volume on that physical disk storage device. At this point a total average physical activity value can also be obtained by summing the physical volume access activity values and dividing by the number of physical devices.

Figure 2A:
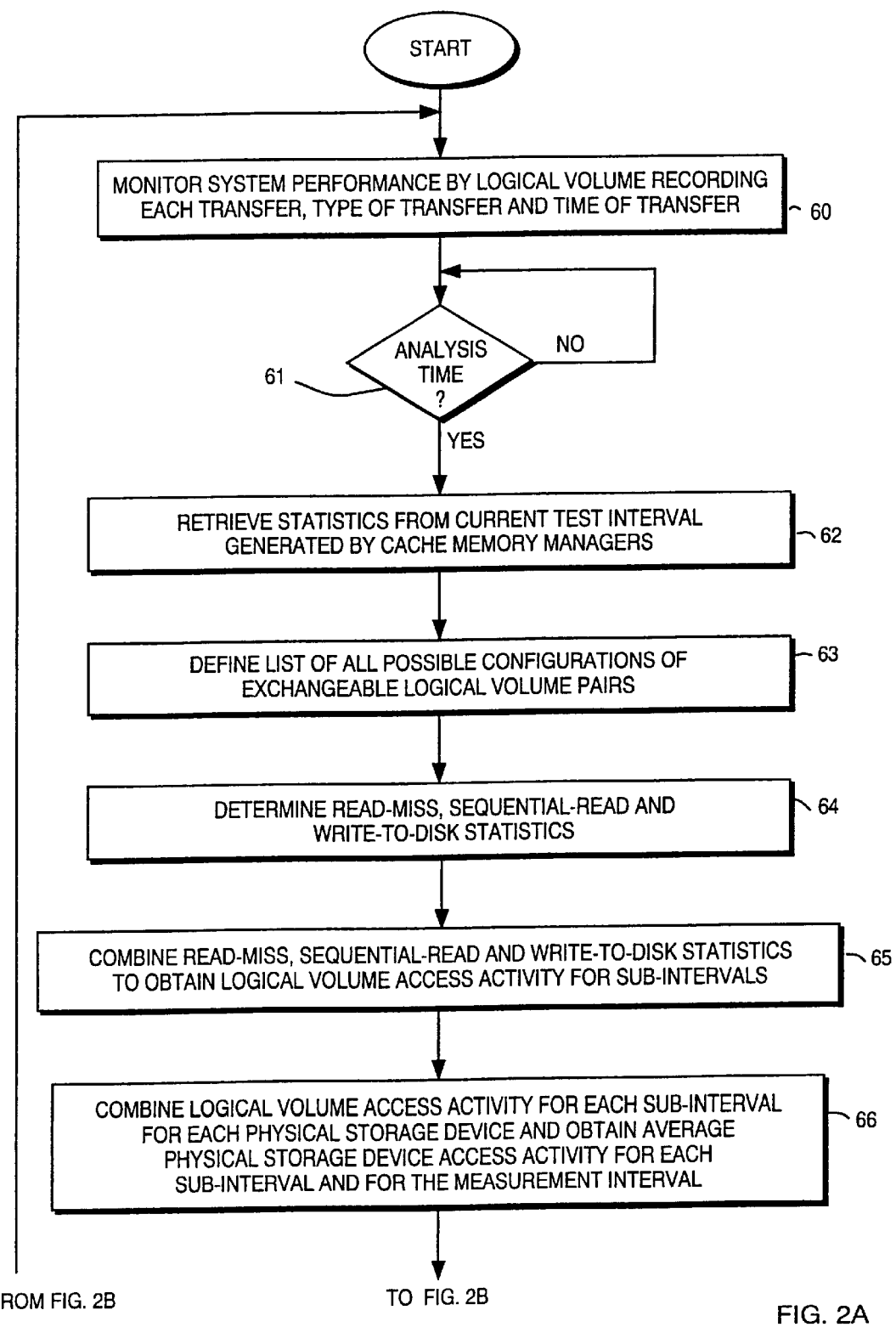
FIGS. 2A and 2B constitute a flow diagram that depicts the procedure for allocating logical volumes in accordance with this invention.
Figure 2B:
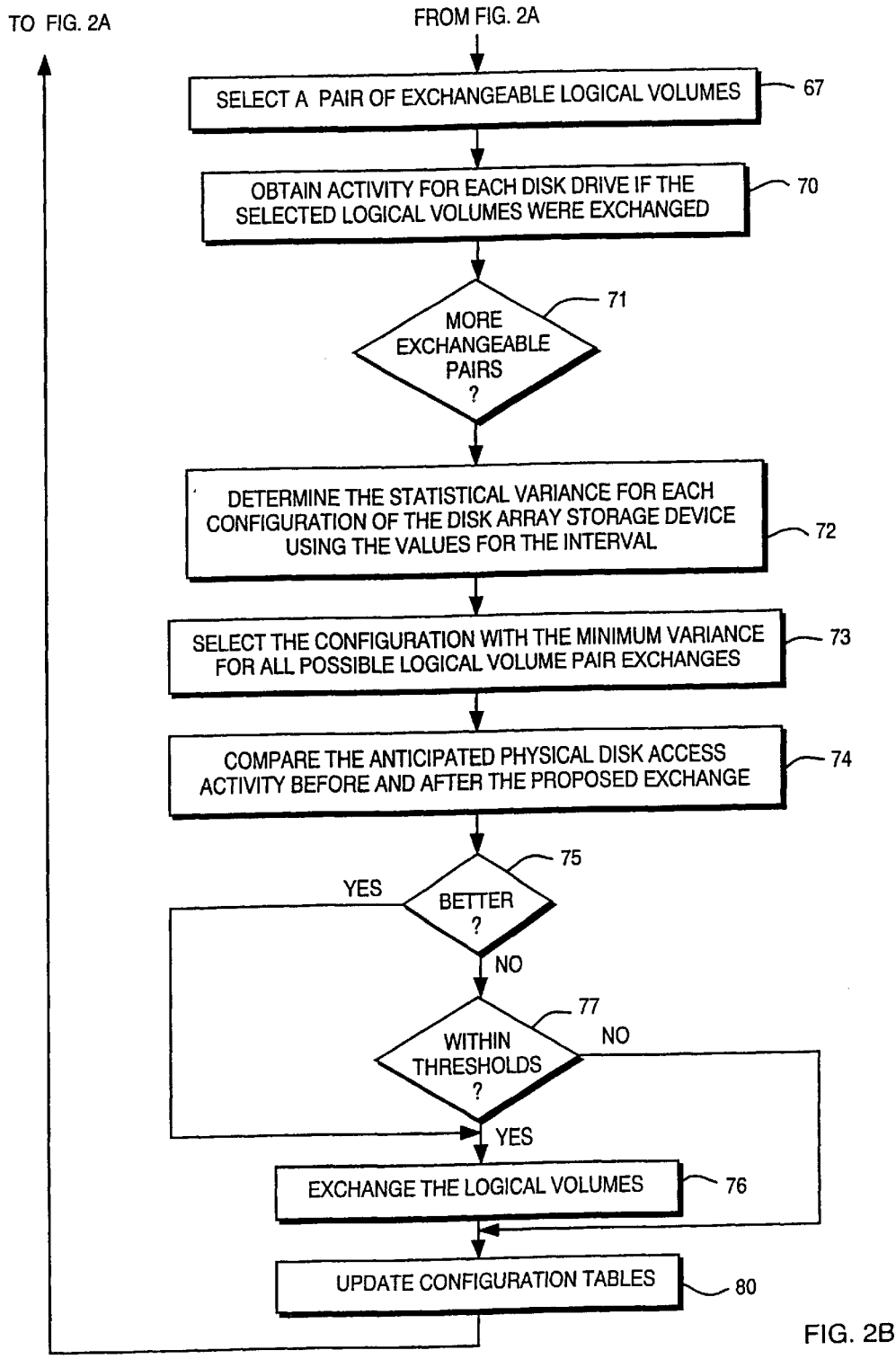

When step 66 in FIG. 2A has been completed, control passes to steps 67 and 70 that form a loop under a loop control 71 in FIG. 2B. Specifically step 67 selects one of the possible reconfigurations as defined by a pair of logical volumes from the list developed in step 63 of FIG. 2A. Assume, for example, that the pair M1 LVA-LVE is selected. In step 70 the load balancer program 51 utilizes the accumulated statistics for obtaining the activity for each physical disk drive as if that possible reconfiguration had been selected as by exchanging those two logical volumes. This loop continues until all the possible reconfigurations, represented by all the logical volume pairs in the list, have been evaluated. Once this occurs, control branches to step 72 to define a statistical variance for each configuration according to $$|E(x^2)-[E(x)]^2|_{min} \qquad (1)$$

That is, for each possible configuration the load balance program 51 step 72 determines the average access activity value for the physical disk storage devices with the logical volume pairs and obtains a difference from the average physical drive access activity value obtained in step 65 assuming each pair is exchanged. Thereafter step 72 produces the statistical variance for each logical volume pair exchange. In step 73 the load balancer program 51 selects that possible reconfiguration comprising the logical volume pair that produces the minimum statistical variance. Processes for obtaining the above-identified statistical variances are well known in the art.

After that selection, the identity of the logical-volume pair is used in a pretest of the selection. As previously indicated, the monitor 50 accumulates data as discrete sets on a periodic and recorded time basis. In step 74 the load balancing program breaks the total test interval into subintervals that may include one or more sampling periods. Next the activity values for each subinterval or group of subintervals are determined. If the access activity value for exchange effected physical drives is less than the original, step 75 branches to step 76 to initiate the exchange. If a subinterval exists that exceeds the average, step 77 determines whether the access activity value is within an acceptable limit. If it is, the exchange occurs in step 77 and the configuration tables in the system are updated to reflect the new configuration. Otherwise no exchange is made.

When step 76 exchanges the designated logical volumes, such an exchange, or swap, can occur by selecting an unused area in one of the physical disk drives to operate as a buffer. This may be an unused area in a physical disk storage device or in a dynamic spare physical disk storage device. The general use of physical disk storage devices as dynamic spares is known in the art. In other circumstances it may be possible to utilize a cache memory such as the cache memory 33 in FIG. 1, as a buffer. If a single buffer is to be used and logical volumes LVE and LVJ are to be exchanged, a concurrent copy or other transfer sequence can move (1) the LVE logical volume to the buffer, (2) the logical volume LVJ to the corresponding area in the physical disk storage device 31B and (3) the logical volume buffer to the area in physical disk storage device 31D. The use of a concurrent copy or other analogous procedure enables the exchange to occur on-line, albeit with some performance degradation for the duration of the transfer. After the exchange is completed, control branches back to step 60 in FIG. 2A to initiate the monitor 50 thereby to accumulate additional statistics about the new configuration.

In accordance with specific example, assume that both the logical volumes LVE and LVF in physical storage device 31B have become very active and that the logical volume LVJ on physical disk storage device 31D is relatively inactive. If all other logical volumes were equally active, the statistical variance should be minimal when the logical volume pair LVE and LVJ is selected. Therefore those two volumes would be exchanged thereby decreasing the load on the physical disk storage device 31B and increasing the load on the physical disk storage device 31D, but not to the extent that had existed on the physical disk storage device 31B.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for balancing activity on plurality of physical disk storage devices that are divided into plural logical volumes and in an initial configuration and wherein a performance monitor retrieves read and write statistics for each logical volume, said method comprising the steps of:
   A. compiling a list of exchangeable logical volumes,
   B. selecting for reconfiguration a logical volume on the physical disk storage devices that reduces the imbalance of activity based upon the compiled statistics including:
      i. determining a statistical variance for each logical volume by
         a. obtaining an average access activity for all physical disk storage devices containing exchangeable logical volumes, and
         b. for each exchangeable logical volume determining, for each physical disk storage device, an access activity value and a difference between a calculated activity access value and the average access activity for all physical drives, and
      ii. selecting that logical volume which, when reconfigured, will result in a minimal statistical variance, and
   C. establishing the selected reconfiguration by transferring the data stored on the selected logical volume to another physical disk storage device.

2. A method as recited in claim 1 wherein said physical disk storage device activity is represented by "x" and the statistical variance is given by $$|E(x^2)-(E(x)^2|_{min}.$$

3. A method as recited in claim 1 wherein the selection includes determining for each logical volume an access activity value related to the number of reading and writing operations to the logical volume, said reading and writing operations being weighted differently.

4. A method as recited in claim 3 wherein said writing operations are weighted one-half of reading operations.

5. A method as recited in claim 4 wherein the physical disk drives are in an array that operates with a cache memory and reading operations are divided into read hit operations that occur when data being read resides in the cache memory and read miss operations then data must be retrieved from a physical disk drive, said access activity value excluding read hit operations.

6. A method as recited in claim 5 wherein the reading operations include sequential reading operations that retrieve data from sequential locations in a physical disk drive, said determination of an access activity value assigning to each sequential reading operation a value equal to one-quarter of the value assigned to a non-sequential reading operation.

7. A method as recited in claim 5 wherein a logical volume is mirrored on two physical disk storage devices and the total number of read misses to the mirrored logical volume are halved.

8. A method as recited in claim 5 wherein writing operations include first writing operations that initially write information to the cache memory and second write operations that write information from the cache memory to a physical disk drive, said determination of an access activity value including only the second writing operations.

9. Apparatus for balancing activity on a plurality of disk storage devices that are divided into plural logical volumes of predetermined sizes and of predetermined functional characteristics, said load balancer comprising:

A. means for gathering read and write disk access statistics for each exchangeable logical volume over a time interval, each exchangeable logical volume being constituted by a logical volume that is capable of swapping the data stored therein to another disk storage device, B. a program for determining appropriate reconfigurations of logical volumes for balancing loads including:
　　i. means for compiling a list of exchangeable logical volumes based upon the size and functional characteristics of the logical volumes,
　　ii. means for selecting a possible reconfiguration of the disk storage devices based upon swapping a logical volume list to minimize imbalance in activity based upon the compiled statistics, and C. means for testing the effect of each possible reconfiguration whereby said program identifies one of the possible reconfigurations and the corresponding logical volume, and D. means for effecting the selected reconfiguration by transferring the data in the corresponding logical volume to another disk storage device.

10. Apparatus as recited in claim 9 wherein said testing means includes means for dividing the interval into subintervals and subinterval testing means for testing the access activity levels for each subinterval based upon the exchange.

11. Apparatus as recited in claim 10 wherein said possible configuration selecting means includes means for determining a statistical variance for each possible reconfiguration and means for identifying that reconfiguration for which a minimal variance exists.

12. Apparatus as recited in claim 11 wherein said means for determining the statistical variance includes:
　i. means for obtaining an average access activity for all disk storage devices containing exchangeable logical volumes, and
　ii. means for determining, for each possible reconfiguration and for each disk storage device, an access activity value and a difference between a calculated activity access value and the average access activity for all drives.

13. Apparatus as recited in claim 10 disk storage device activity is represented by "x" and wherein said configuration selecting means includes:
　i. means for determining a statistical variance for each possible reconfiguration given by:

$$|E(x^2)-(E(x))^2|_{min} \qquad (2)$$

and
　ii. means for identifying that possible reconfiguration for which a minimal variance exists.

14. Apparatus as recited in claim 13 wherein said possible configuration selecting means includes means for determining for each logical volume a weighted access activity value related to the number of reading and writing operations to the logical volume, said reading and writing operations being weighted differently.

15. Apparatus as recited in claim 13 wherein said possible configuration selecting means includes means is for determining for each logical volume a weighted access activity value related to the number of reading and writing operations to the logical volume, said writing operations being weighted one-half of reading operations.

16. Apparatus as recited in claim 13 wherein the disk storage devices operate with a cache memory and reading operations are divided into read hit operations that occur when data being read resides in the cache memory and read miss operations when data must be retrieved from a disk storage device and wherein said possible configuration selecting means includes means for determining for each logical volume a weighted access activity value related to the number of reading and writing operations to the logical volume excluding read hit operations.

17. Apparatus as recited in claim 13 wherein the reading operations include sequential reading operations that retrieve data from sequential locations in a disk storage device and wherein said possible configuration selecting means includes means for determining for each logical volume a weighted access activity value by assigning to each sequential reading operation a value equal to one-quarter of the value assigned to a non-sequential reading operation.

18. Apparatus as recited in claim 13 wherein a logical volume is mirrored on two disk storage devices and wherein said possible configuration selecting means includes means for determining for each logical volume a weighted access activity value wherein the total number of read misses to the mirrored logical volume are halved.

19. Apparatus as recited in claim 13 wherein writing operations include first writing operations that initially write information to the cache memory and second write operations that write information from the cache memory to a disk storage device and wherein said possible configuration selecting means includes means for determining for each logical volume a weighted access activity value that includes only the second writing operations.

* * * * *